United States Patent
Sohtell

(10) Patent No.: US 12,177,290 B1
(45) Date of Patent: Dec. 24, 2024

(54) APPLICATION DOWNLOAD AND MANAGEMENT FOR MARINE ELECTRONIC DEVICES

(71) Applicant: NAVICO, INC., Tulsa, OK (US)

(72) Inventor: Gustav Sohtell, Gothenburg (SE)

(73) Assignee: Navico, Inc., Tulsa, OK (US)

( * ) Notice: Subject to any disclaimer, the term of this patent is extended or adjusted under 35 U.S.C. 154(b) by 0 days.

(21) Appl. No.: 18/341,104

(22) Filed: Jun. 26, 2023

(51) Int. Cl.
*H04L 12/70* (2013.01)
*H04L 67/06* (2022.01)
*H04L 67/12* (2022.01)

(52) U.S. Cl.
CPC .............. *H04L 67/06* (2013.01); *H04L 67/12* (2013.01)

(58) Field of Classification Search
CPC ................................. H04L 67/06; H04L 67/12
USPC ......................................................... 709/217
See application file for complete search history.

(56) References Cited

U.S. PATENT DOCUMENTS

| | | | |
|---|---|---|---|
| 10,534,404 B2 | 1/2020 | Bhattacharyya | |
| 2008/0296364 A1* | 12/2008 | Pappas | G06Q 10/10 235/377 |
| 2016/0011863 A1* | 1/2016 | Isaacson | G01S 15/02 717/173 |
| 2016/0012650 A1 | 1/2016 | Coloney et al. | |
| 2016/0013998 A1 | 1/2016 | Coloney et al. | |
| 2017/0168800 A1* | 6/2017 | Schroeder | F21V 5/04 |
| 2018/0124557 A1 | 5/2018 | Bartley et al. | |
| 2019/0245912 A1* | 8/2019 | Ananthapur Bache | H04L 45/302 |
| 2021/0208747 A1* | 7/2021 | Bachman | G06F 8/20 |
| 2023/0150621 A1 | 5/2023 | Sohtell | |
| 2023/0359315 A1* | 11/2023 | Karunamuni | G06F 3/04883 |

* cited by examiner

*Primary Examiner* — Moustafa M Meky
*Assistant Examiner* — Elizabeth Kassa
(74) *Attorney, Agent, or Firm* — Nelson Mullins Riley & Scarborough LLP

(57) ABSTRACT

Systems and methods for installing an application on a multi-function device which is not internet enabled are provided herein. The system comprises an internet enabled device comprising a processor, a display, and a memory including computer program code. The computer program code is configured to receive user input indicating the selection of an application, and download a file comprising application data. The system further includes a multi-function device being remotely located from the internet enabled device. The multi-function device comprises a processor, a display and a memory including computer program code. The computer program code is configured to cause the processor to engage in data communication with the internet enabled device, receive the file comprising the application data, install the application within the memory, and cause, on the display of the multi-function device, presentation of an interface that enables user interfacing with the underlying application function of the application.

16 Claims, 18 Drawing Sheets

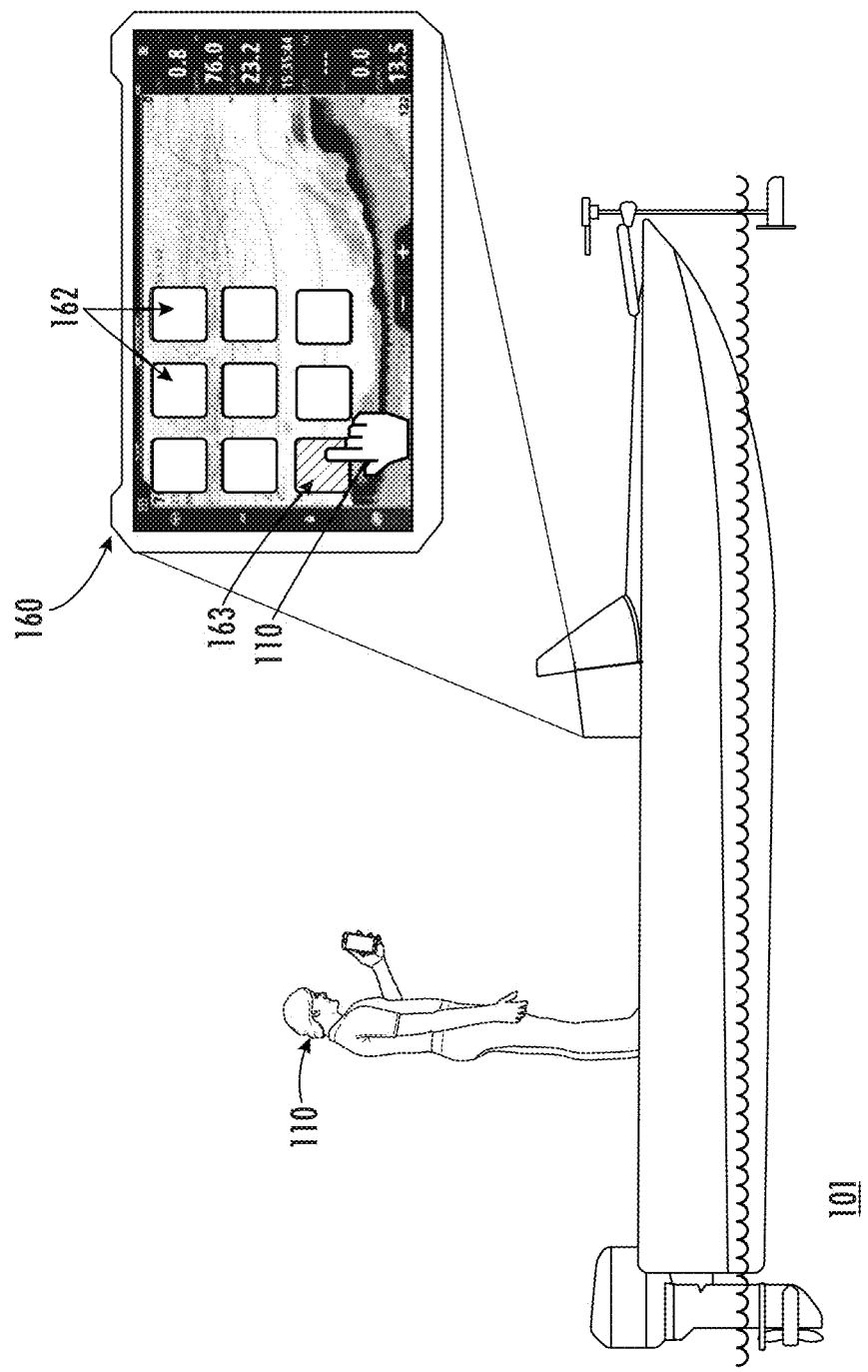

APPLICATION DOWNLOAD AND MANAGEMENT FOR MARINE ELECTRONIC DEVICES

FIELD

Embodiments of the present invention relate generally to presentation of applications on multi-function devices, and more particularly to, providing methods of installation on multi-function devices without access to internet, such as when such multi-function devices are present on a watercraft in a marine environment.

BACKGROUND

Marine electronics devices and other multi-function devices provide essential information to users when navigating bodies of water including, lakes, rivers, oceans, and other navigable waterways. However, on many of these bodies of water, there is not, if any, reliable internet connection. Further, even at docks, internet connections may not be reliable and/or stable. Thus, in order for the marine electronics device (which may be mounted to the watercraft) to receive necessary updates, install applications, or other functionality, the user must rely on a physical mode of transfer (e.g., a secure digital (SD) card or similar device).

However, with technological improvements and developments, a user may want to install different functionality, or third-party applications that may not be easily transferable over physical copies. Further, with the progress of encryption technology some software may not be compatible with a physical copy for transferring.

Thus, there exists a need for an easier way to install an application or similar functionality onto a multi-function device, such that the program is installable without an internet connection, such as is particularly relevant for the marine environment.

BRIEF SUMMARY OF THE INVENTION

As noted above, it can be difficult to install applications and update functionality on multi-function devices, as many multi-function devices are either utilized in environments without internet access or are not enabled to connect to the internet.

Various embodiments of the present invention allow a user to download an application onto a remote device having access to the internet. The remote device is able to transfer the application from the remote device to the multi-function device. The application as installed on the remote device is not compatible for user interfacing with the underlying application function of the application. In this regard, although the application data is installed on the remote internet enabled device, the application may not work on the remote internet enabled device.

The internet enabled device may be configured to transfer or push a copy of the application data to the multi-function device upon establishing data communication with the marine electronics device. In this regard, data communication may be established by proximity, over Bluetooth, Wi-Fi, physical (e.g., cord) or other connection capable of transferring data. Although Wi-Fi is one method of transfer, it should be understood that the application information can be transferred without an internet connection.

In an example embodiment, a system for installing applications is provided. The system comprises an internet enabled device. The internet enabled device comprises a processor, a display, and a memory including computer program code. The computer program code is configured to, when executed, cause the processor to receive user input indicating the selection of an application that includes an underlying application function for utilizing one or more features of the application. The computer program code is further configured to download a file comprising application data. The file is not compatible for user interfacing with the underlying application function of the application on the internet enabled device. The system further comprises a marine electronics device of a watercraft, the marine electronics device being remotely located from the internet enabled device. The marine electronics device comprises a processor, a display, and a memory including computer program code. The computer program code is configured to, when executed, cause the processor to engage in data communication with the internet enabled device, and receive the file comprising the application data. The computer program code is further configured to install the application within the memory, and cause, on the display of the marine electronics device, presentation of an interface that enables the user interfacing with the underlying application function of the application.

In some embodiments, the application may be selected from a parent application store within a parent application. In some embodiments, the parent application may be downloaded from an operating system application store. In some embodiments, after being downloaded onto the internet enabled device, the file comprising the application data may be stored within the parent application. In some embodiments, the parent application may receive updates to the file and may push the updates to the file to the marine electronics device.

In some embodiments, the file may comprise a hash signature. The hash signature may define a set number of marine electronics devices the file may be installed on. In some embodiments, the file may automatically delete from the internet enabled device after the file is installed onto the set number of marine electronics devices.

In some embodiments, the data communication between the internet enabled device and the marine electronics device may be non-internet based. In some embodiments, the data communication between the internet enabled device and the marine electronics device may be proximity based. In some embodiments, the data communication between the internet enabled device and the marine electronics device may be Bluetooth based.

In another example embodiment, a method of installing an application on a multi-function device, where the multi-function device is not internet enabled is provided. The method comprises connecting an internet enabled device to the internet and downloading a file to the internet enabled device. The downloaded file is not compatible with the internet enabled device. The file comprises application data corresponding to an application that includes and underlying application function for utilizing one or more features of the application. The file is further not compatible for user interfacing with the underlying application function of the application. The method further comprises engaging data communication between the internet enabled device and the multi-function device, each of the internet enabled device and the multi-function device being remote from each other. The method further comprises transferring the file to the multi-function device, via data communication. The application is compatible with the multi-function device when used with software of the multi-function device. The method further comprises causing, on a display of the multi-function device, presentation of an interface that enabled user interfacing with the underlying application function of the application.

In some embodiments, the file may be downloaded from a parent application. The parent application being compatible with the internet enabled device. In some embodiments, the parent application may be downloaded from an operating system application store. In some embodiments, the file comprising the application data may be stored within the parent application. In some embodiments, the parent application receives updates to the file, and the internet enabled device pushes the updates to the multi-function device.

In some embodiments, the file may contain a compatible signature and the multi-function device may comprise a device signature. Transfer of the file from the internet enabled device to the multi-function device may be executed when the compatibility signature and the device signature are compatible. In some embodiments, the file may contain a hash signature defining a set number of multi-function devices the file may be stored on. In some embodiments, the file may automatically delete from the internet enabled device when the set number of multi-function devices is reached.

In yet another embodiment, a marine electronics device for a watercraft is provided. The marine electronics device comprises a display, a processor and a memory comprising a computer program code. The computer program code is configured to, when executed, cause the processor to receive a notification of an application to be installed. The application includes an underlying application function for utilizing one or more features of the application. The computer program code is further configured to engage in data communication with an internet enabled device, the internet enabled device being remote from the marine electronics device. The computer program code is further configured to receive a file comprising application data from the internet enabled device. The file being incompatible for interfacing with the internet enabled device. The computer program code is further configured to install the file and cause, on the display, presentation of an interface utilizing functionality from the application.

In some embodiments, the application may be selected from a parent application.

BRIEF DESCRIPTION OF THE DRAWINGS

Reference will now be made to the accompanying drawings, which are not necessarily drawn to scale, and wherein:

FIG. 5B illustrates the user selecting the installed application on the multi-function device, in accordance with some embodiments discussed herein;

DETAILED DESCRIPTION

Figure 1:
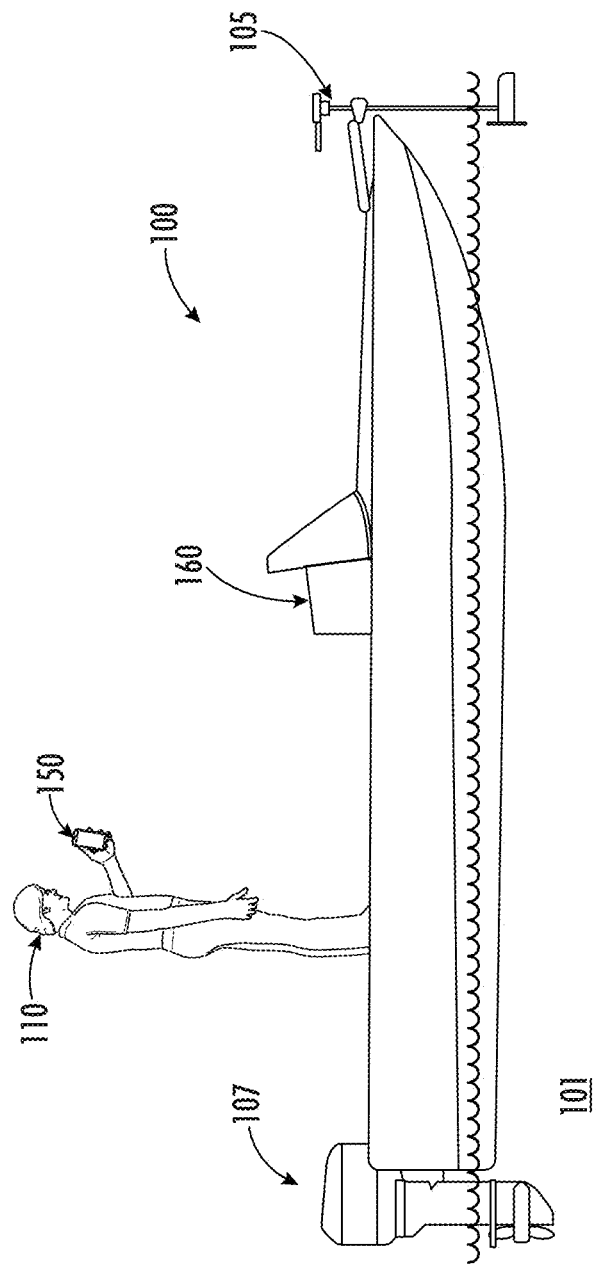
FIG. 1 illustrates an example watercraft including various marine devices, in accordance with some embodiments discussed herein.

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to like elements throughout.

FIG. 1 illustrates an example watercraft 100 including various marine devices, in accordance with some embodiments discussed herein. As depicted in FIG. 1, the watercraft 100 (e.g., a vessel) is configured to traverse a marine environment, (e.g., body of water 101), and may use one or more sonar transducer assemblies disposed on and/or proximate to the watercraft 100. Notably, the example watercraft 100 contemplated herein may be a surface watercraft, a submersible watercraft, or any other implementation known to those skilled in the art.

Depending on the configuration, the watercraft 100 may include a primary motor 107, which may be a main propulsion motor such as an outboard or inboard motor. Additionally, the watercraft 100 may include a trolling motor 105 configured to, for example, propel the watercraft 100 and/or maintain a position of the watercraft 100.

The watercraft 100 may also include one or more multi-function devices (e.g., a marine electronics device 160), such as may be utilized by a user 110 to interact with, view, or otherwise control various functionality regarding the watercraft, including, for example, nautical charts and various sonar systems. In the illustrated embodiment, the multi-function device 160 is positioned proximate the helm (e.g., steering wheel) of the watercraft 100—although other places on the watercraft 100 are contemplated. In some embodiments, the multi-function device 160 may be mounted within the watercraft 100 such that it is integral with the watercraft 100. Likewise, additionally or alternatively, a remote device (such as a user input device, or a user's mobile device) may include functionality of a marine electronic device. In some embodiments, the user 110 may utilize an internet enabled device 150 (e.g., a mobile device) while on the watercraft 100, although the internet enabled device 150 may not be connected to the internet at all times.

The watercraft 100 may also comprise other components, such as within the one or more marine electronic devices 160 at the helm. In some embodiments, the watercraft 100 may comprise an AIS transceiver and/or a direction sensor, and these components may be positioned at or near the helm (although other positions relative to the watercraft are also contemplated). In other embodiments, these components may be integrated into the marine electronics device 160 or other devices. Other example devices include a wind sensor, one or more speakers, and various vessel devices/features (e.g., doors, bilge pump, fuel tank, etc.), among other things. Additionally, one or more sensors may be associated with marine devices; for example, a position sensor may be provided to detect the position of various marine devices individually.

Figure 2:
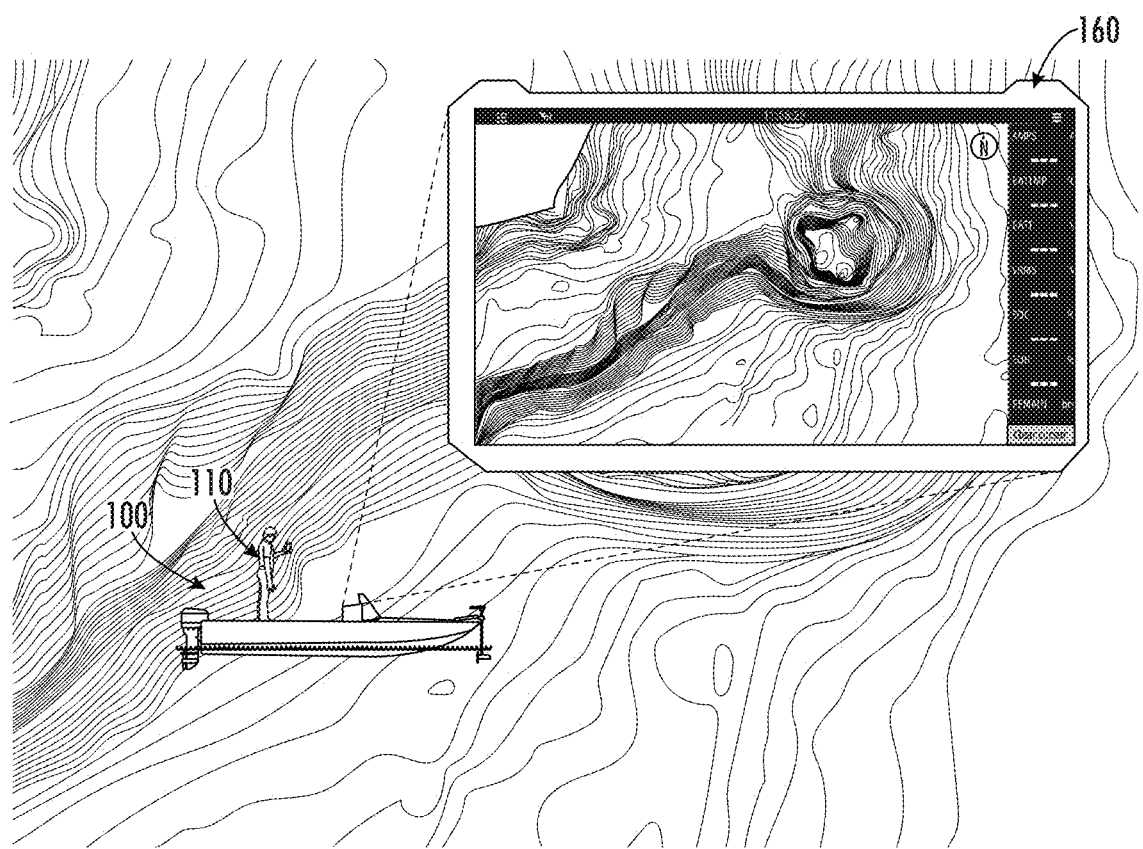
FIG. 2 illustrates an example watercraft including a marine electronics device display presenting a navigational chart and various menus, in accordance with some embodiments discussed herein.

The marine electronics device 160 may be utilized when the user 110 is on a body of water 101 as illustrated in FIG. 2. In this regard, the marine electronics device 160 provides functionality when in a remote area (e.g., where there is no internet access). In some embodiments, the remote area may be on the body of water 101, however, the remote area may be at the dock or a similar area, specifically where there is limited, unreliable, or no internet connection. Further, there may be times when the user 101 intends to transfer information from the internet enabled device 150 to the marine electronics device 160 but does not, or is unable to, until reaching the remote location. In this regard, it is desirable to have a system for transferring data and/or files from the remote device 150 to the marine electronics device 160 without an internet connection.

To explain, the system may comprise both the remote internet enabled device and the multi-function device. A user may download an application file on to the remote internet enabled device. At a later time when the user is on the watercraft, the application file may be transferred from the remote internet enabled device to the multi-function device. In some embodiments, the application file may be incompatible for user interfacing with the underlying application function on the internet enabled device, but may be compatible with interfacing with the underlying application function of the application when installed on the multi-function device, as will be explained further herein.

Figure 3A:
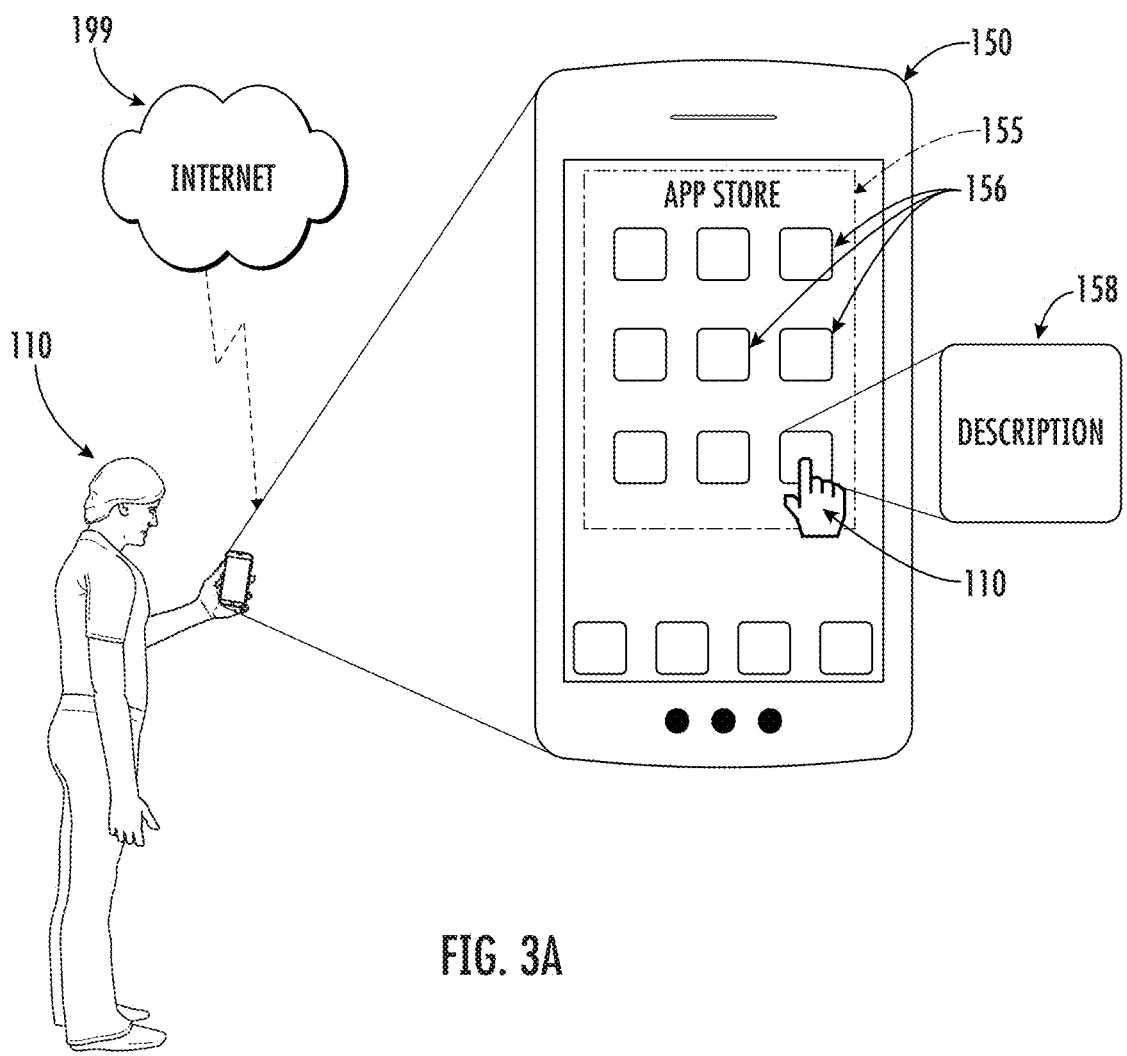
FIG. 3A illustrates an example application store available on a remote internet enabled device, in accordance with some embodiments discussed herein.

FIGS. 3A-E illustrate downloading the application file to the internet enabled device, and how the application file may function on the internet enabled device. As illustrated in FIG. 3A, a user 110 may have an internet enabled device 150 connected to the internet 199. While connected to the internet, the internet enabled device 150 may have access to an application store 155. In some embodiments, the application store 155 may be an operating systems application store, while in other embodiments, the application store 155 may be within a parent application. In other embodiments, the application store 155 may be localized within a parent application, for example, the Lowrance® application, or similar. The application store 155 may include one or more downloadable applications 156 compatible with the multi-function device. However, as the marine electronics device 160 may not be internet enabled, the internet enabled device 150 may download an application file for later transfer to the marine electronics device 160.

In some embodiments, the application store 155 may provide a description 158 of the one or more applications 156 when selected by the user 110. The description 158 may include a summary of the functionality of the application, for example if the application is an additional feature for a different application, compatibility for different multi-function devices, a subscription cost, a number of file transfers available, or similar information. In this regard, if the application 153 is a fee based application, each fee may allow transfer to a predetermined number of multi-function devices. Similarly the application description 158 may include a list of integrable applications.

In some embodiments, the application file 153 may include a hash signature. In some embodiments, the hash signature may be embedded into the application file. The hash signature may include compatibility information, subscription information, payment information, or other information which may be included in an encrypted file or as encrypted information. In this regard, the application file 153 may comprise a hash signature, and the multi-function device may comprise a hash decrypter, and the application file is only installable on the multi-function device when the hash decrypter is able to decrypt the hash signature, as will be descried more herein.

Figure 3B:
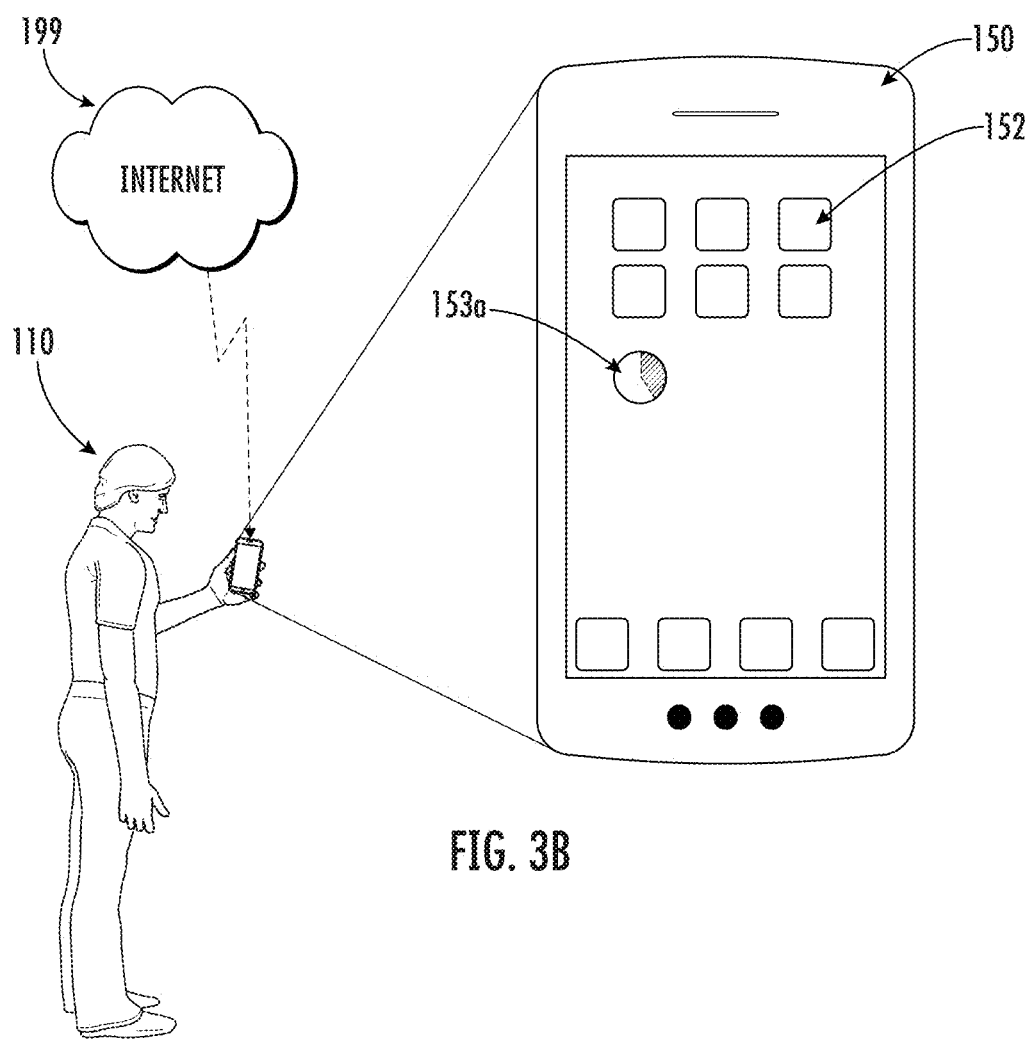
FIG. 3B illustrates a user downloading an example application to the remote internet enabled device from the example application store, in accordance with some embodiments discussed herein.

The user 110 may select the desired application for download and download 153a the application onto the internet enabled device 150, as illustrated in FIG. 3B. In some embodiments, the application file download 153a may present on the main display of the internet enabled device 150 among other applications 152. After the data for the application file 153 is downloaded and installed on the internet enabled device 150 the application file 153 may be transferred from the internet enabled device 150 to the multi-function device.

Figure 3C:
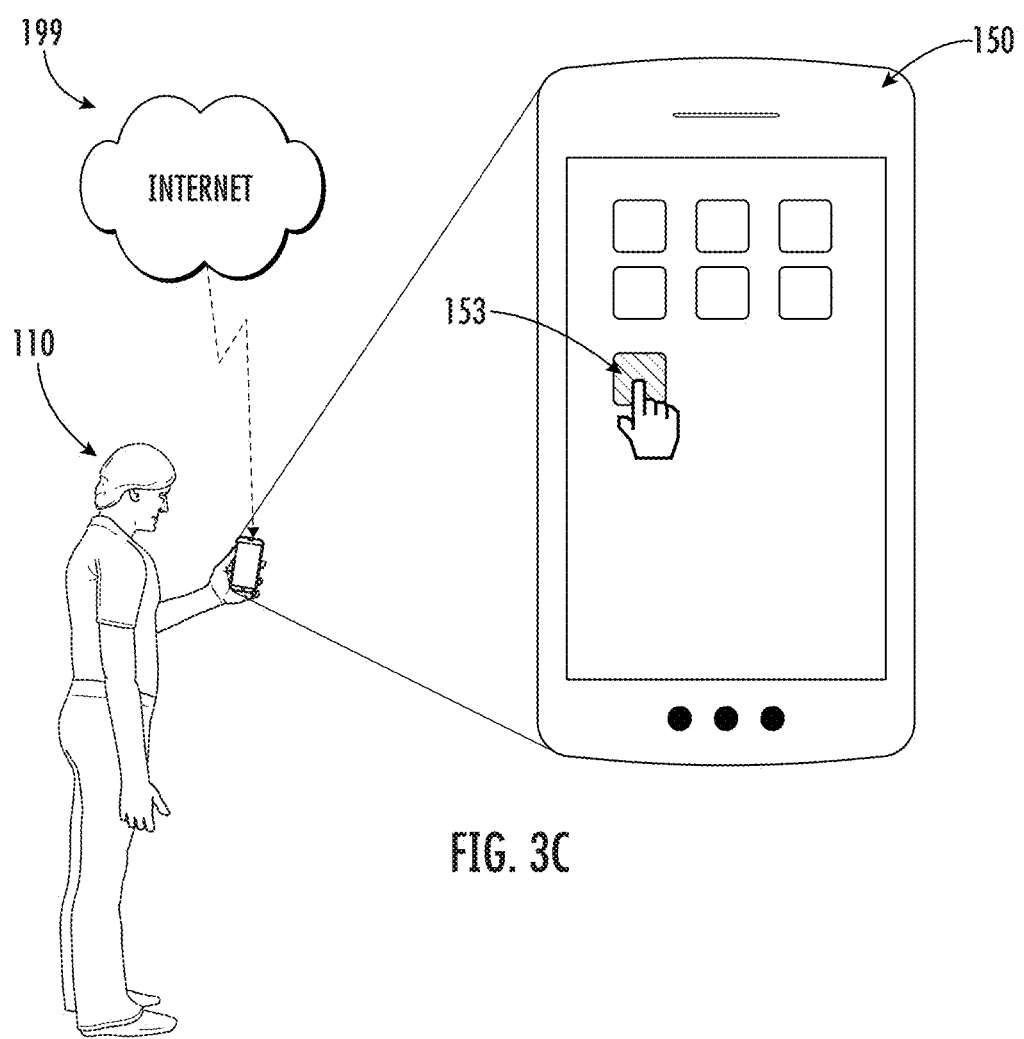
FIG. 3C illustrates the user opening the example application, in accordance with some embodiments discussed herein.
Figure 3D:
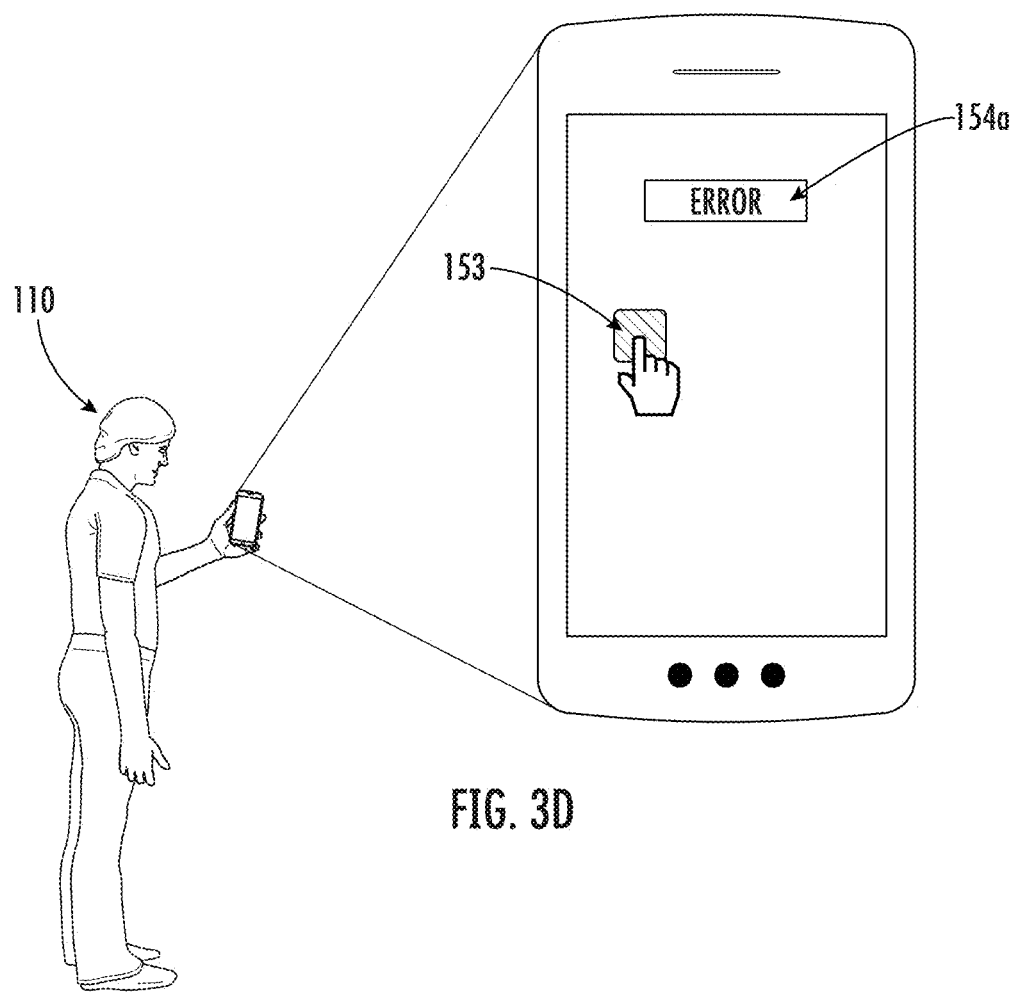
FIGS. 3D-E illustrate example error messages when opening the example application on the remote device, in accordance with some embodiments discussed herein.
Figure 3E:
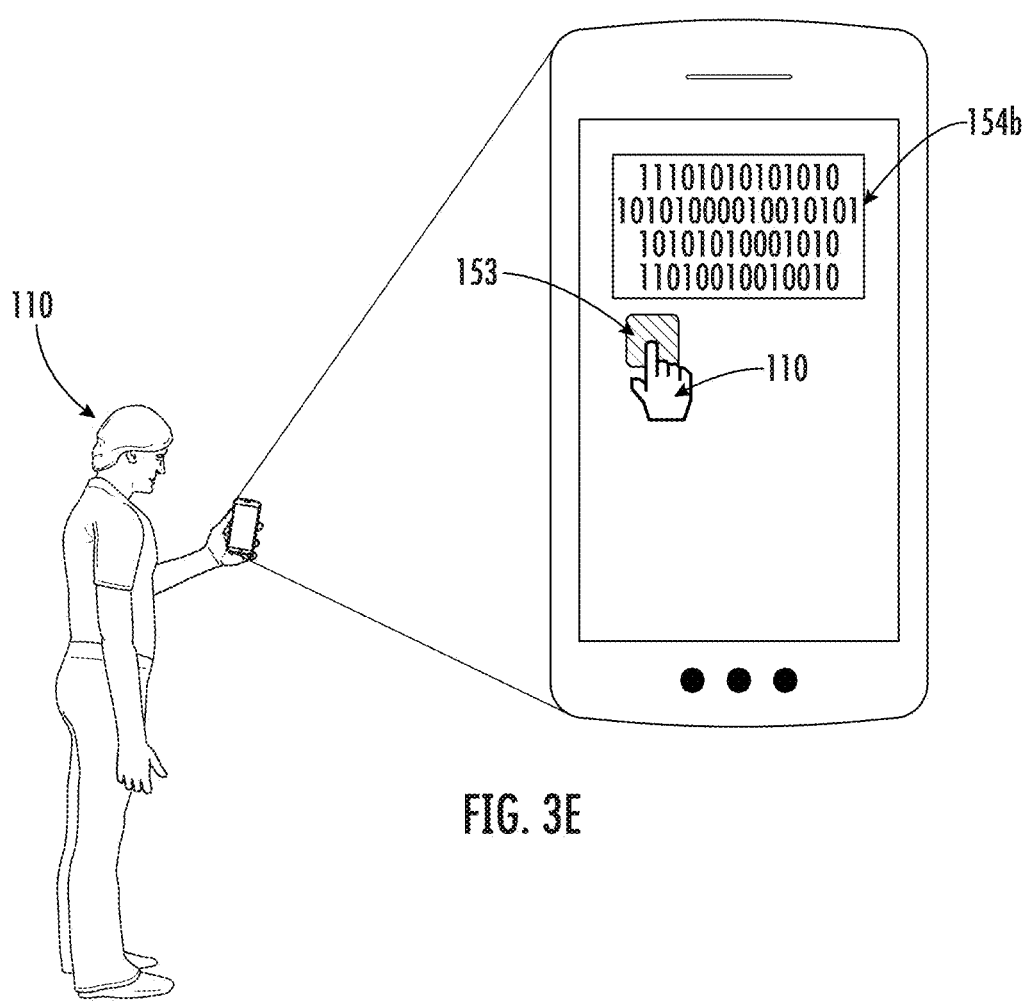

In some embodiments, as illustrated in FIGS. 3C-E the application file 153 may be displayed on the home screen of the internet enabled device 150 and may appear to be selectable. However, upon selection of the application file 153, the internet enabled device 150 may present an error message 154a as illustrated in FIG. 3D. Similarly, as illustrated in FIG. 3E, the internet enabled device 150 may present code 154b, or a similar note style indication of the application data contained within the application file 153. In this regard, the underlying application may not be compatible for user interfacing with underlying application functions of the application, said differently, the application file data may not be compatible with the operating system of the internet enabled device 150. In some embodiments, the downloaded application may not display on the home screen of the remote internet enabled device 150 and, instead, may be held in the background. Accordingly, in some embodiments, the future connection and download to the multi-function device may occur automatically without the user even knowing.

Although described herein as being incompatible with the operating system of the internet enabled device 150, in some embodiments, the application file may be able to run on the operating system of the internet enabled device 150. In this regard, the application file may be able to interface with the underlying operating system of the internet enable device 150.

In some embodiments, the application file 153 may be stored within a parent application. In this regard, the application file 153 may not appear on the display home screen of the internet enabled device, but rather be stored within the data of the parent application. In some embodiments, the application file 153 may include functionality within the parent application on the internet enabled device 150.

Figure 4A:
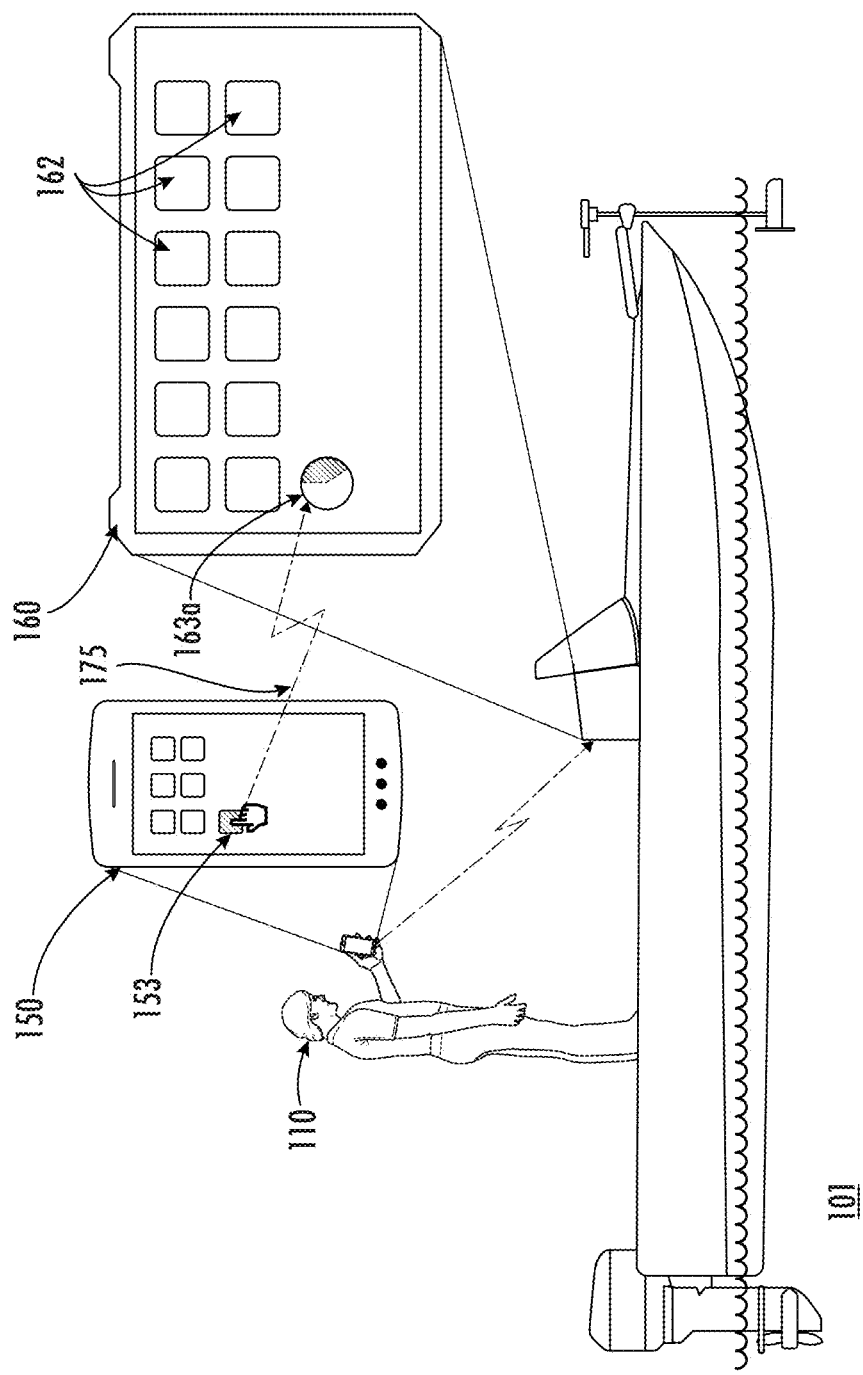
FIG. 4A-B illustrate the remote device in data communication with the multi-function device pushing the application information from the remote device to the multi-function device, in accordance with some embodiments discussed herein.
Figure 4B:
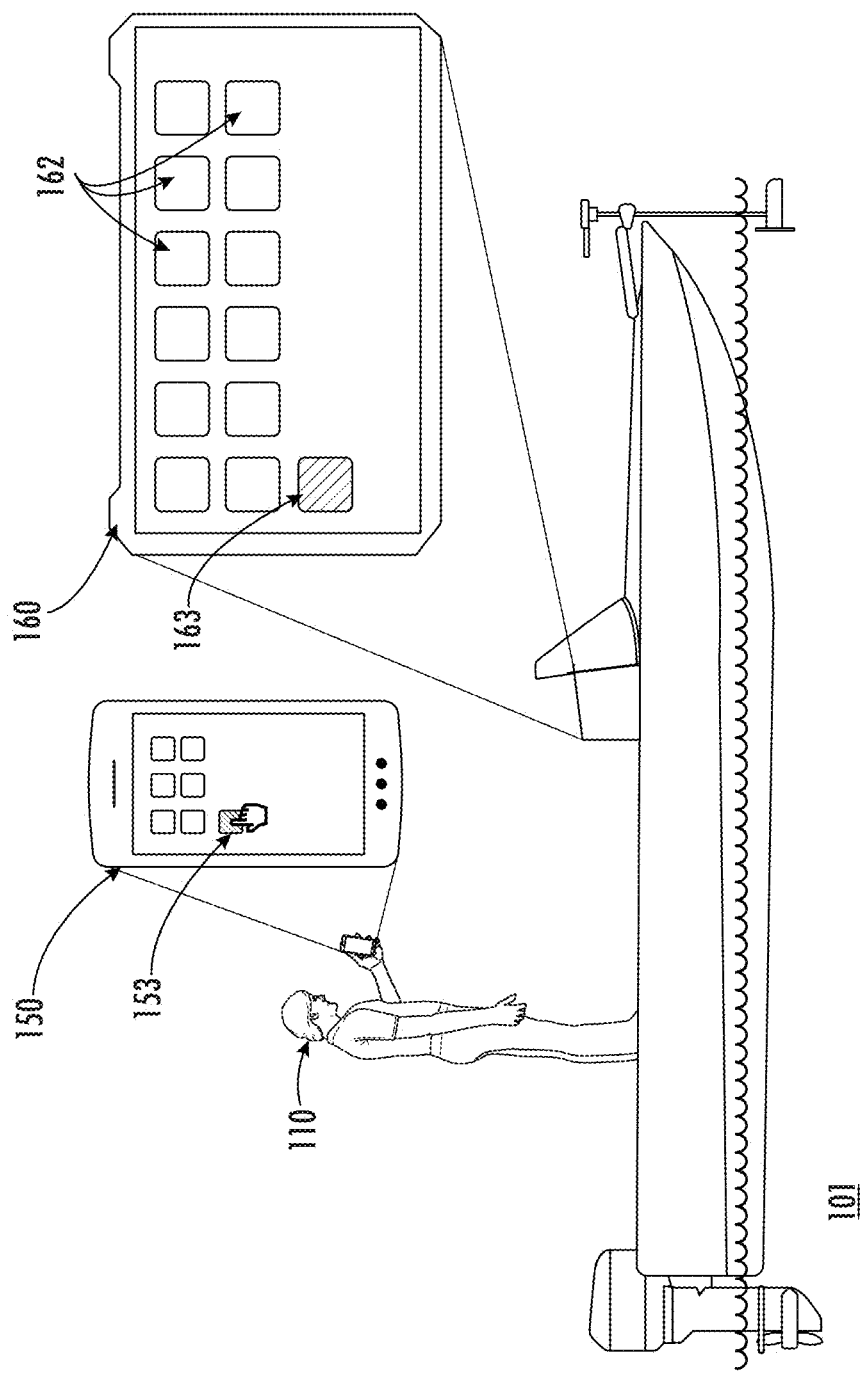

After installation of the application file 153 onto the internet enabled device 150, the user 110 may push the application file from the internet enabled device 150 to the marine electronics device 160, as illustrated in FIGS. 4A-B. In some embodiments, the internet enabled device 150 may engage in data communication 175 with the marine electronics device 160. The user may activate the data communication 175 between the internet enabled device 150 and the marine electronics device, while in other embodiments, the data communication 175 may be initiated automatically when the internet enabled device 150 and the marine electronics device 160 are within a predetermined proximity to one another. In some embodiments, data communication 175 may be initiated when the internet enabled device 150 is within 20 feet of the marine electronics device 160, within 10 feet of the marine electronics device 160, or similar. In some embodiments, the data communication 175 may be over Bluetooth, while in other embodiment the data communication 175 may be completed over Wi-Fi. In some embodiments, the data communication 175 may be achieved through a physical connection.

Once data communication 175 is established the application file 153 may be pushed, or transferred, to the marine electronics device 160. The application 163a may install on the marine electronics device 160, more specifically the application 163 may be installed within the memory of the marine electronics device 160. In some embodiments, the data communication 175 may cease once the application 163 is fully installed on the marine electronics device 160, as illustrated in FIG. 4B. After installation, the application 163 may appear on the display of the marine electronics device 160 along with prior loaded applications 162.

In some embodiments, after file transfer from the internet enabled device 150 to the marine electronics device 160, the application file 153 may delete from the internet enabled device 150. In this regard, the application file 153 may not appear on the internet enabled device 150. In other embodiments, the application file 153 may remain on the internet enabled device 150, such that the internet enabled device 150 may receive updates to the application file 153 when the connected to the internet, as will be explained further herein.

The application 163 may be configured as a stand alone application. In this regard, the marine electronics device 160 may be configured for interfacing with the underlying application function of the application, for example, the application 163 may provide fish culling, temperature profile mapping, sonar way point storage, etc.

Figure 5A:
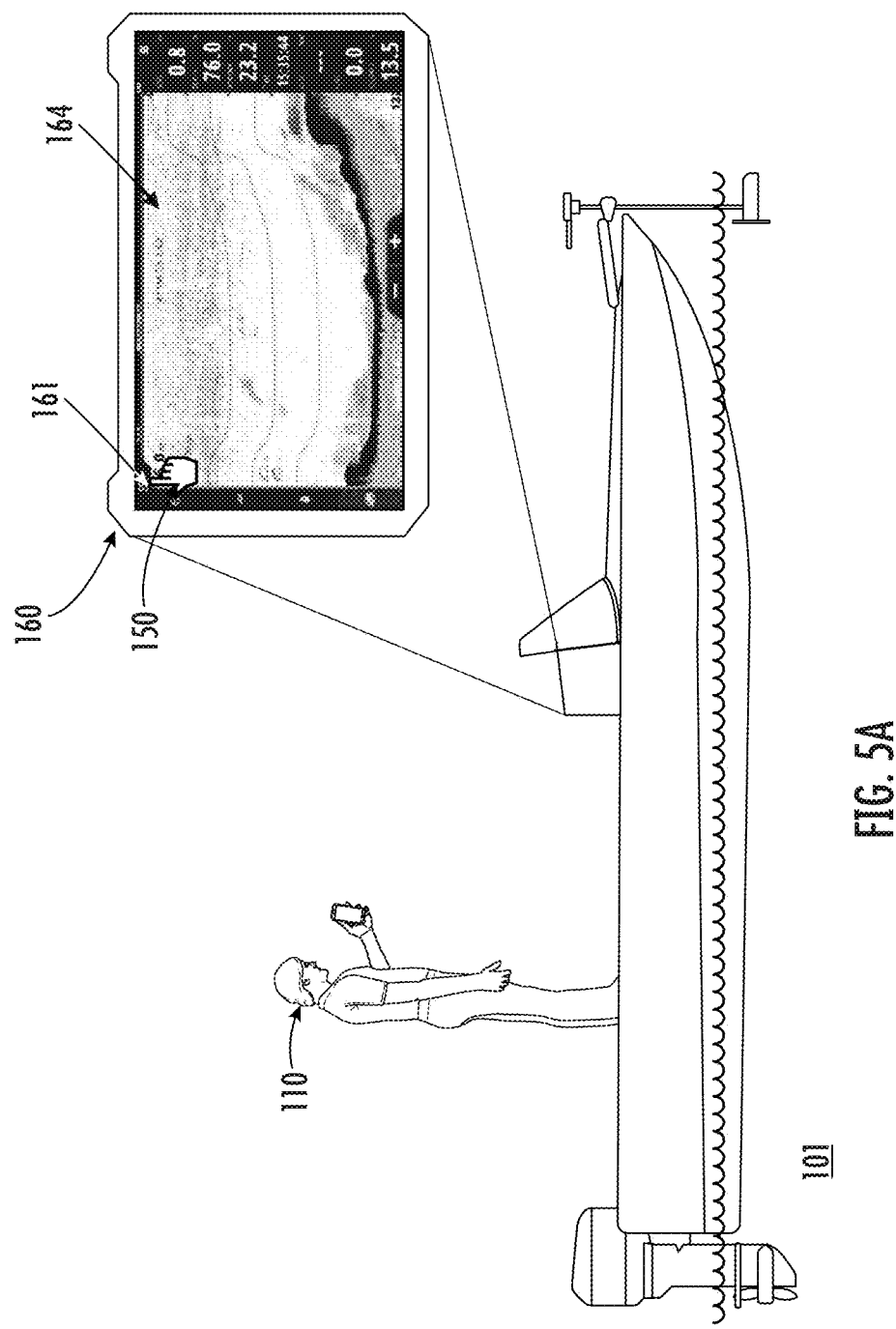
FIG. 5A illustrates a user interacting with the example multi-function device, presenting a sonar image, in accordance with some embodiments discussed herein.
Figure 5C:
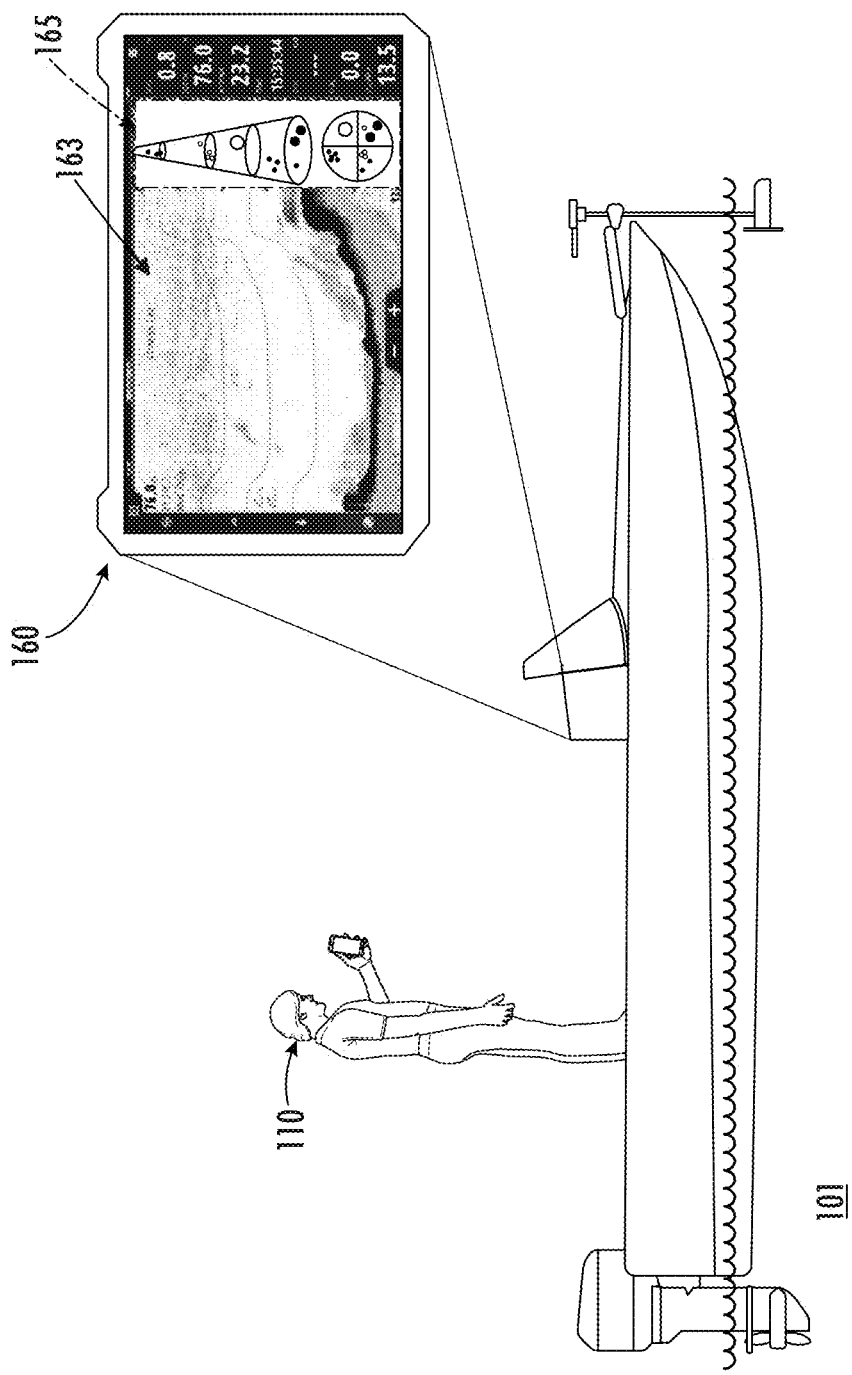
FIG. 5C illustrates the multi-function device running the application, in accordance with some embodiment discussed herein.

In some embodiments, the application 163 may be configured to add functionality to a parent application. FIGS. 5A-C illustrate an example of the application 163 adding functionality to a parent application. In some embodiments, the parent application may be a sonar application where the display of the marine electronics device 160 may present a sonar image 164. A menu 161 may be present as an overlay on the sonar image 164, upon user selection, the user 110 may select the application 163.

In some embodiments, the application 163 may add functionality 165 to the sonar image 164. As depicted in the illustrated embodiment of FIG. 5C, the functionality 165 may show the depth and location of fish detected within the sonar image. In some embodiments, the added functionality 165 may be a bottom profile, a size tracker, a waypoint file, or similar.

Figure 6A:
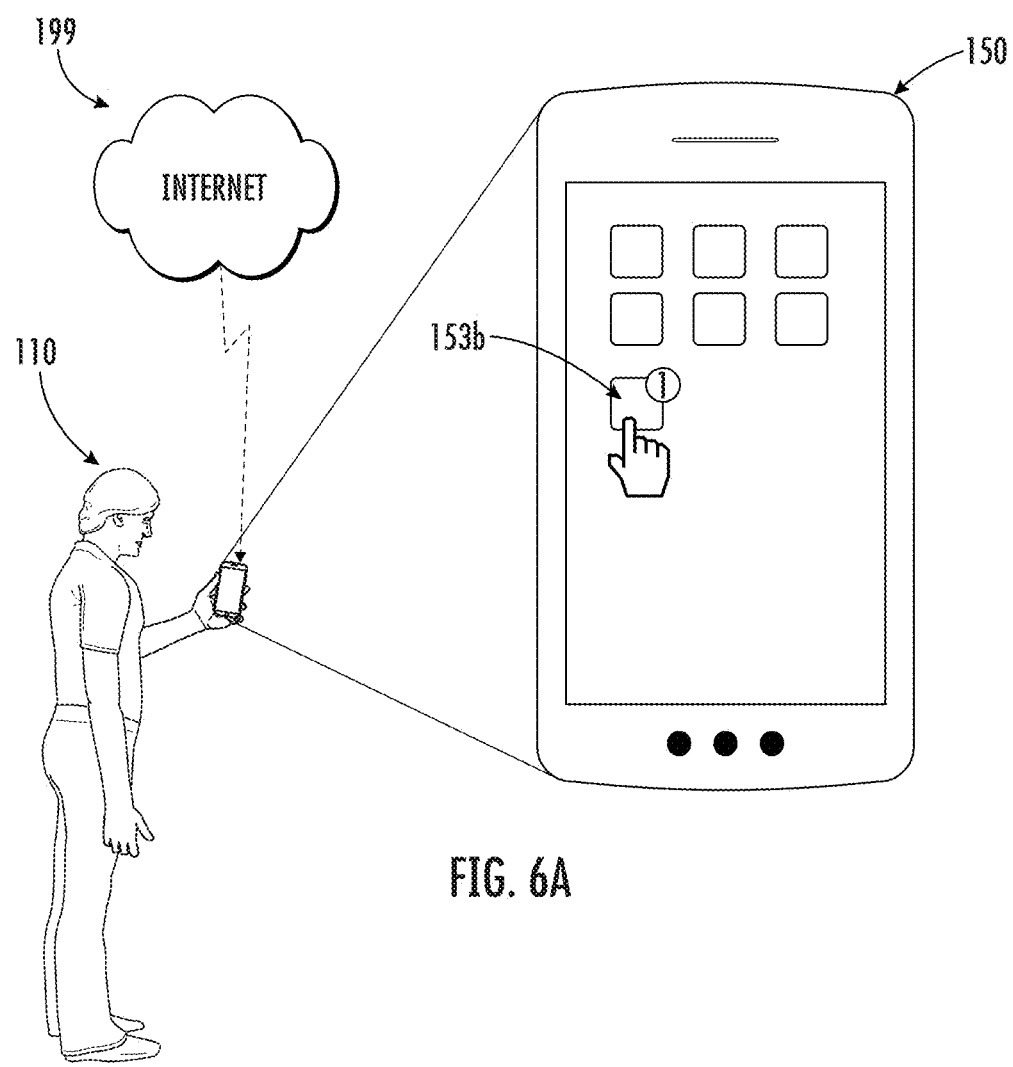
FIGS. 6A-C illustrate an example method of updating the application for the multi-function device, in accordance with some embodiments discussed herein.
Figure 6B:
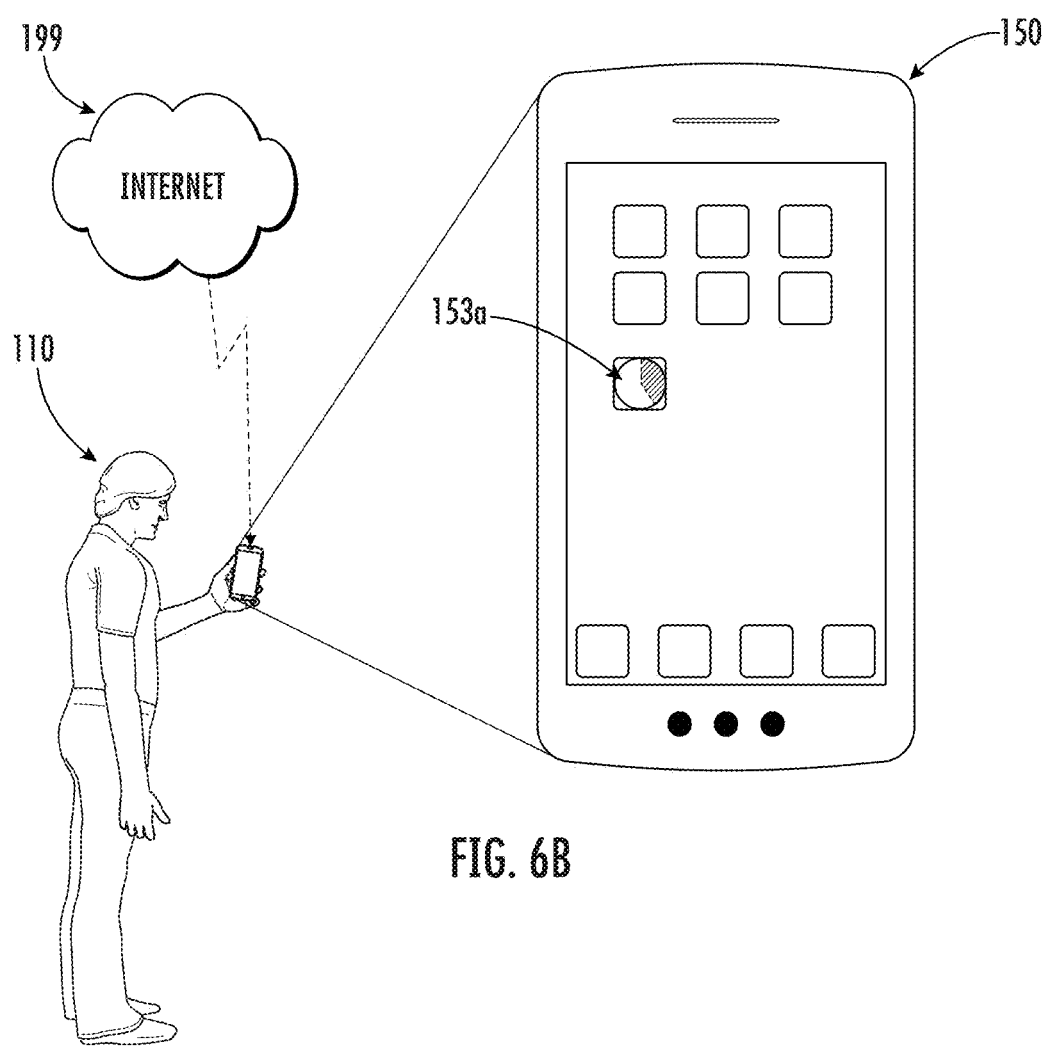
Figure 6C:
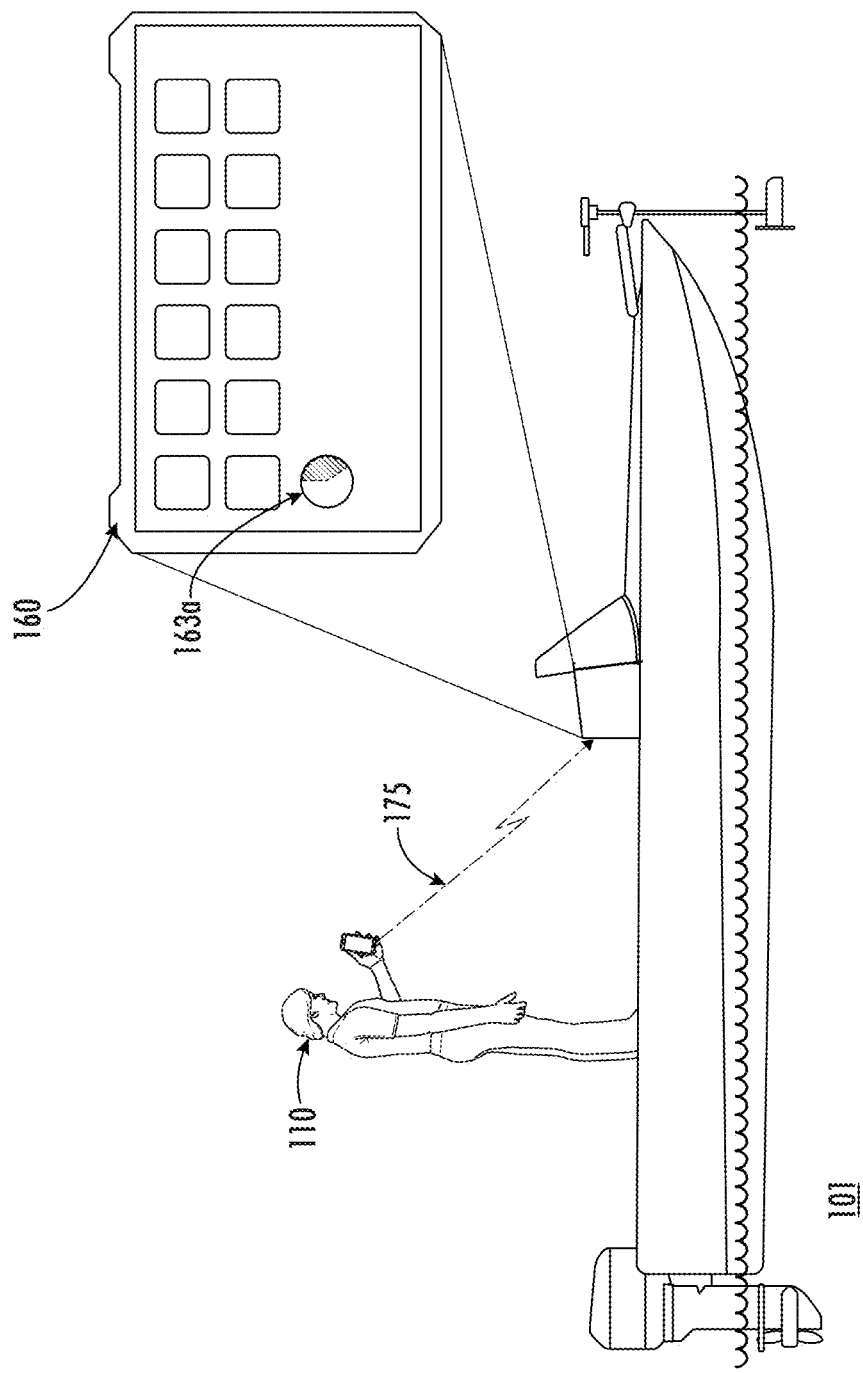

As discussed earlier, the application file 153 may receive updates to push to the multi-function device, as illustrated in FIGS. 6A-C. In some embodiments, when the internet enabled device 150 connects to the internet 199, the application file 153b may indicate a pending update, as indicated by the number 1. The user 110 may select to update the application file 153b. The application file may download the update while the internet enabled device 150 is connected to the internet 199, as illustrated in FIG. 6B. When the internet enabled device 150 and the multi-function device engage in data communication 175, the internet enabled device 150 may push the updated application file to the marine electronics device 160, to update the application 163a.

Example System Architecture

Figure 7:
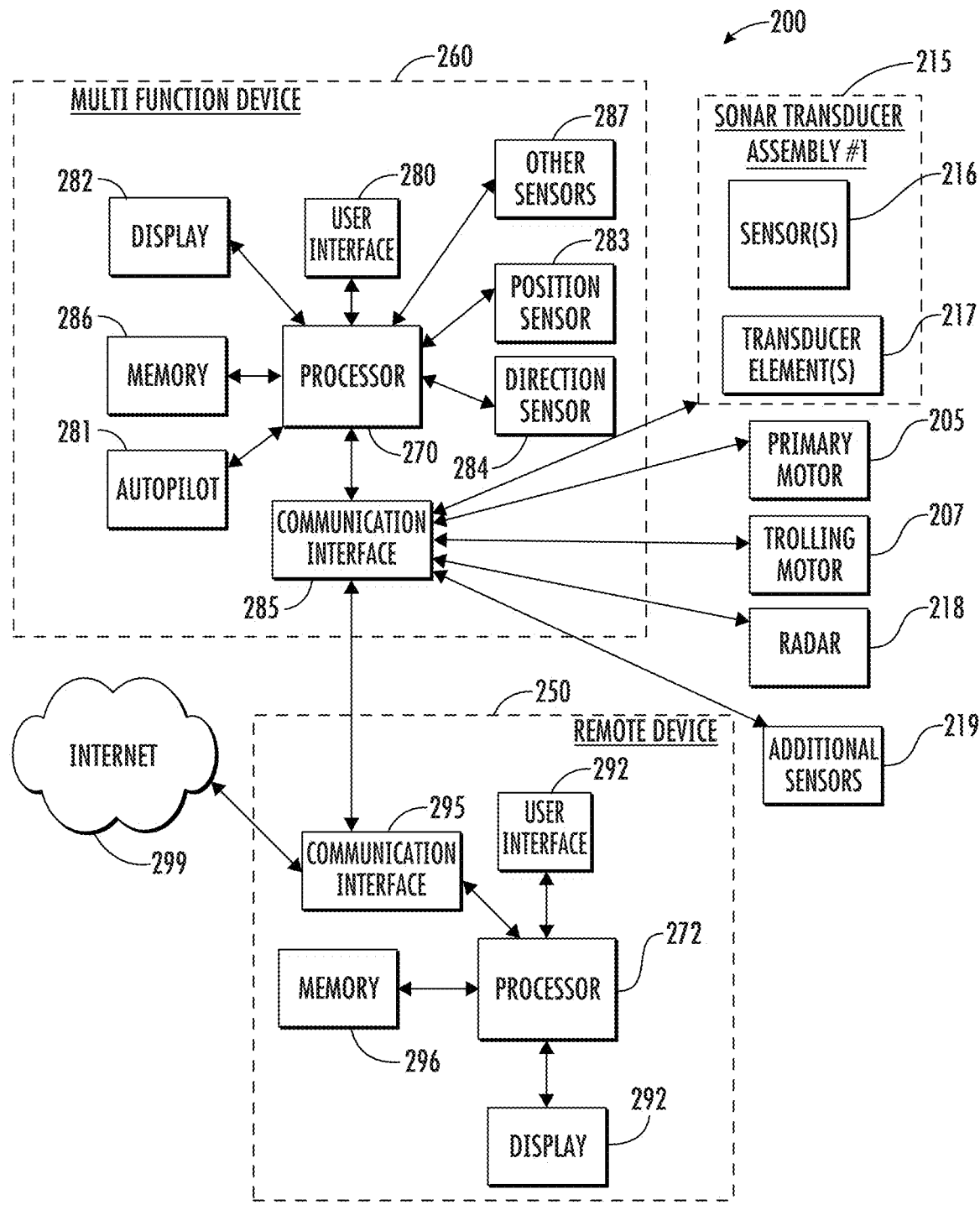
FIG. 7 illustrates a block diagram of an example system with various electronic devices, multi-function devices, and secondary devices shown, in accordance with some embodiments discussed herein.

FIG. 7 illustrates a block diagram of an example system 200 according to various embodiments of the present invention described herein. The illustrated system 200 includes a multi-function device, for example a marine electronic device 260 and an internet enabled device 250. In some embodiments, the system 200 may comprise numerous devices, including marine devices, and remote devices. As shown in FIG. 7, one or more sonar transducer assemblies 215 (which may include one or more sensor(s) 216 in addition to one or more transducer element(s) 217), one or more radar 218, a primary motor 205 and/or a trolling motor 207 may be provided. One or more devices may be implemented on the marine electronics device 260. For example, a position sensor 283, a direction sensor 284, and other sensors 287 (e.g., proximity sensors, etc.) may be provided within the marine electronics device 260. These marine devices may be integrated within the marine electronics device 260, mounted on or otherwise attached to the watercraft at another location and connected to the marine electronics device 260, and/or the marine devices may be implemented as a or on a remote device in some embodiments. The system 200 may include any number of different systems, modules, or components; each of which may comprise any device or means embodied in either hardware, software, or a combination of hardware and software configured to perform one or more corresponding functions described herein.

The marine electronic device 260 may include at least one processor 270, a memory 286, a communication interface 285, a user interface 280, a display 282, autopilot 281, and one or more sensors (e.g., position sensor 283, direction sensor 284, proximity sensor, other sensors 287). One or more of the components of the marine electronic device 260 may be located within a housing or could be separated into multiple different housings (e.g., be remotely located).

The internet enabled device 250 may include one or more processors 272, a memory 296, a communication interface 295, a user interface 292, and a display 292. One or more components of the internet enabled device 250 may be separated into multiple different housings (e.g., be remotely located).

The processor(s) 270, 272 may be any means configured to execute various programmed operations or instructions stored in a memory device (e.g., memory 286, 296) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the at least one processor 270, 272 as described herein. For example, the at least one processor 270,272 may be configured to analyze sonar data, radar data, and/or chart data. As another example, the processor 270, may be configured to analyze sensor data to determine if the internet enable device 250 is detected, which may include determining a relative position of the internet enabled device 250, such as with respect to distance-wise and/or lateral-wise regarding the display 282.

In some embodiments, the at least one processor 270 may be further configured to implement signal processing. In some embodiments, the at least one processor 270 may be configured to perform enhancement features to improve the display characteristics of data or images, collect or process additional data, such as time, temperature, GPS information, waypoint designations, current, environmental conditions (e.g., wind speed, wind direction) or others, or may filter extraneous data to better analyze the collected data.

In an example embodiment, the memory 286, 296 may include one or more non-transitory storage or memory devices such as, for example, volatile and/or non-volatile memory that may be either fixed or removable. The memory 286, 296 may be configured to store instructions, computer program code, application data, sonar data, radar data, chart data, and additional data such as, bathymetric data, location/position data in a non-transitory computer readable medium for use, such as by the at least one processor 270, 272 for enabling the marine electronic device 260 and the internet enabled device 250 to carry out various functions in accordance with example embodiments of the present invention. For example, the memory 286 could be configured to receive and store application information from the internet enabled device 250 for processing by the at least one processor 270. Additionally or alternatively, the memory 286 could be configured to store instructions for execution by the at least one processor 270.

The communication interface 285 may be configured to enable data communication with external systems, for example, a communication interface 295 of the internet enabled device 250. In this manner, the marine electronic device 260 may retrieve stored data from the remote device 250. In some embodiments, the communication interface 285 of the marine electronics device 260 and the communication interface 295 of the internet enabled device 250 may engage in data communication through Bluetooth, proximity transfer, a physical connection, WiFi, or similar communication methods. Additionally or alternately, the marine electronic device 260 may store marine data locally, for example within the memory 286. Additionally or alternatively, the marine electronic device 260 may transmit or receive data, such as environmental conditions.

In some embodiments, the internet enabled device 250 may also be configured to communication with other devices or systems (such as through the internet 299). Using the internet 299, the internet enabled device 250 may communicate with and send and receive data with external sources such as a cloud, server, etc. The internet enabled device 250 may send and receive various types of data. For example, the internet enabled device may receive application data and send the data to the marine electronics device 260 when the communication interfaces 285, 295 are in data communication.

In some embodiments, the marine electronic device 260 may also be configured to communicate with other devices or systems (such as through the external network or through other communication networks, such as described herein). For example, the marine electronic device 260 may communicate with a propulsion system of the watercraft 100 (e.g., for autopilot control); or another system. Using the external network, the marine electronic device 260 may communicate with and send and receive data with external sources such as a cloud, server, etc. The marine electronic device 260 may send and receive various types of data. For example, the system may receive weather data, tidal data, alert data, current data, among others. However, this data is not required to be communicated using external network, and the data may instead be communicated using other approaches, such as through a physical or wireless connection via the communication interface 285.

The communication interface 285 of the marine electronic device 260 may also include one or more communications modules configured to communicate with one another in any of a number of different manners including, for example, via a network. In this regard, the communication interface 285 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or sonar transducer assemblies) may be included in the system 200.

The position sensor 283 may be configured to determine the current position and/or location associated with travel of the marine electronic device 260 (and/or the watercraft 100). For example, the position sensor 283 may comprise a GPS, bottom contour, inertial navigation system, such as machined electromagnetic sensor (MEMS), a ring laser gyroscope, or other location detection system. Additionally or alternately, the position sensor 283 may be configured to determine the orientation of the watercraft 100. Alternatively or in addition to determining the location of the marine electronic device 260 or the watercraft 100, the position sensor 283 may also be configured to determine the position and/or orientation of an object outside of the watercraft 100. In some embodiments, the position sensor 283 may be configured to determine a location associated with travel of the watercraft. For example, the position sensor 283 may utilize other sensors 287 (e.g., speed sensor, and/or direction sensor 284) to determine a future position of the watercraft 100 and/or a waypoint along the route of travel.

The display 282 (e.g., one or more screens) may be configured to present images and may include or otherwise be in communication with a user interface 285 configured to receive input from a user. The display 282 may be, for example, a conventional LCD (liquid crystal display), a touch screen display, mobile device, or any other suitable display known in the art upon which images may be displayed.

In some embodiments, the display 282 may present one or more sets of data (or images generated from the one or more sets of data). Such data includes chart data, radar data, sonar data, weather data, location data, position data, orientation data, environmental data, sonar data, or any other type of information relevant to the watercraft. Environmental data may be received from the external network, retrieved from the other sensors 287, and/or obtained from sensors positioned at other locations, such as remote from the watercraft. Additional data may be received from marine devices such as a radar 218, a primary motor 205 or an associated sensor, a trolling motor 207 or an associated sensor, an autopilot 281, a position sensor 283, a direction sensor 284, additional sensors 287, onboard memory 286 (e.g., stored chart data, historical data, stored sonar data, etc.), or other devices.

The user interface 280 may include, for example, a keyboard, keypad, function keys, mouse, scrolling device, input/output ports, touch screen, or any other mechanism by which a user may interface with the system.

Although the display 282 of FIG. 7 is shown as being directly connected to the at least one processor 270 and within the marine electronic device 260, the display 282 could alternatively be remote from the at least one processor 270 and/or marine electronic device 260. Likewise, in some embodiments, the position sensor 283 and/or user interface 280 could be remote from the marine electronic device 260.

The marine electronic device 260 may include one or more other sensors/devices 287, such as configured to measure or sense various other conditions. The other sensors/devices 287 may include, for example, an air temperature sensor, a water temperature sensor, a current sensor, a light sensor, a wind sensor, a speed sensor, tide sensor, or the like.

The components presented in FIG. 7 may be rearranged to alter the connections between components. For example, in some embodiments, a marine device outside of the marine electronic device 260, such as the radar 218, may be directly connected to the at least one processor 270 rather than being connected to the communication interface 285. Additionally, sensors and devices implemented within the marine electronic device 260 may be directly connected to the communication interface 285 in some embodiments rather than being directly connected to the at least one processor 270.

Example Flowchart(s) and Operations

Embodiments of the present invention provide methods, apparatus and computer program products for operating according to various embodiments described herein. Various examples of the operations performed in accordance with embodiments of the present invention will not be provided with reference to FIGS. 8-9.

Figure 8:
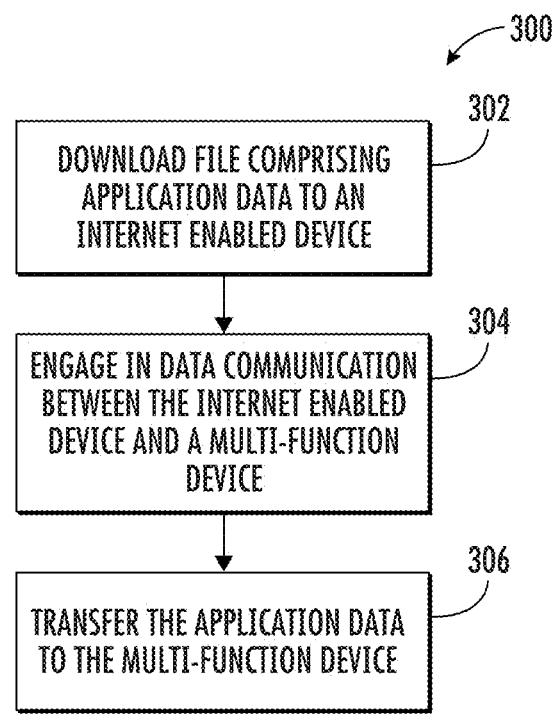
FIG. 8 illustrates a flowchart of an example method of installing an application on a multi-function device, in accordance with some embodiments discussed herein.

FIG. 8 is a flowchart illustrating an example method 300 for installing an application onto a multi-function device. At operation 302, a file comprising application data is downloaded onto an internet enabled device. In some embodiments, the application may be downloaded from an application store run on the operating system of the internet enabled device, while in other embodiments the application may be downloaded from a parent application, wherein the application data is configured as an add on for the parent application. At operation 304, the remote device and a multi-function device are engaged in data communication. In some embodiments, the data communication may be proximity based, Bluetooth based, WiFi based, or based on a physical connection between the two devices. In some embodiments, the data communication is engaged automatically, while in other embodiments, a user engages the data communication. At operation 306 the application data file is transferred to the multi-function device from the remote device. After transfer to the multi-function device, the application is enabled to interface with the multi-function device.

Figure 9:
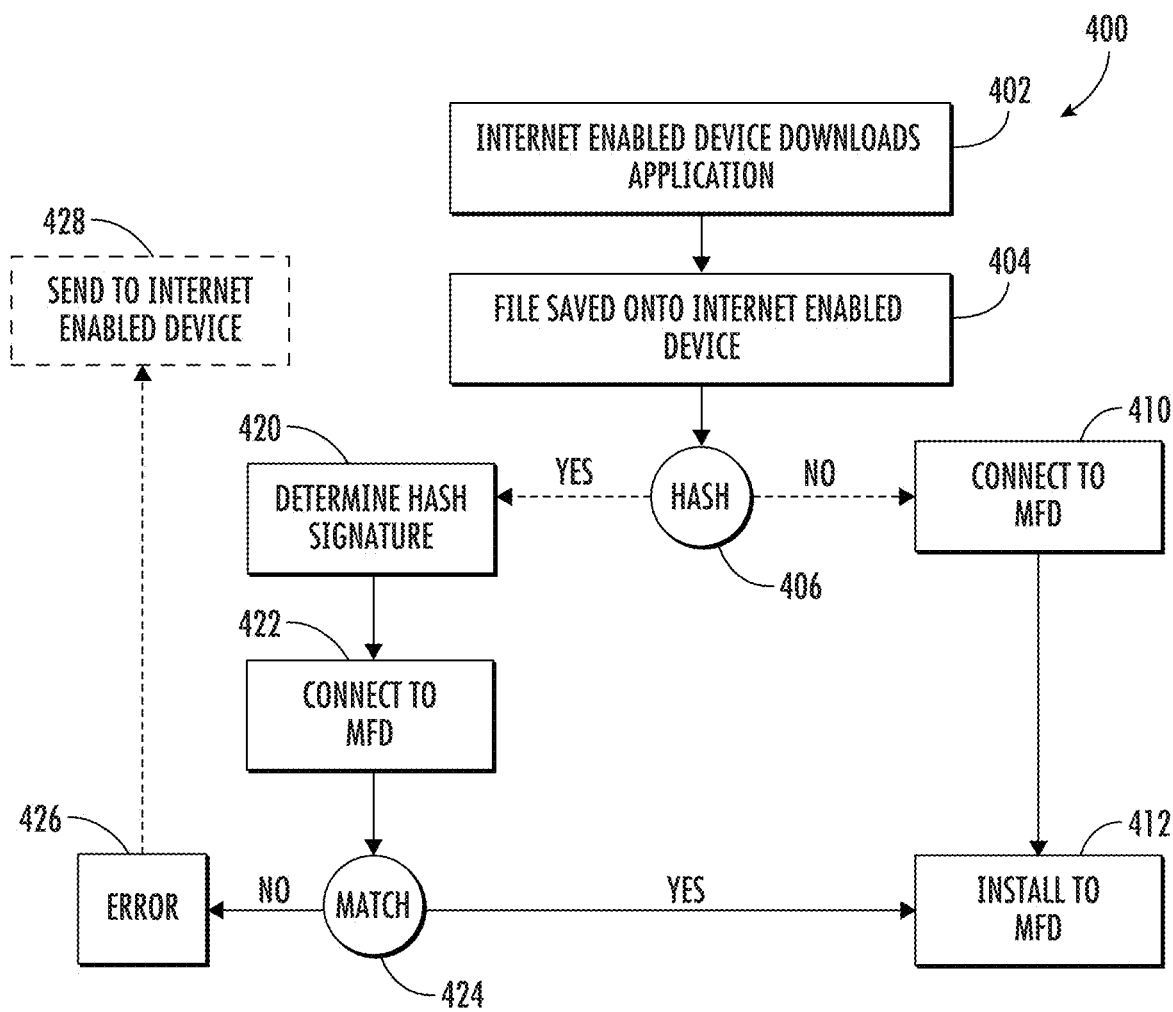
FIG. 9 illustrates a flowchart of an example method of installing an application on a multi-function device, in accordance with some embodiments discussed herein.

FIG. 9 is a flowchart illustrated an example method 400 for installing an application onto a multi-function device. At operation 402 the internet enabled device downloads the application. In some embodiments, the application may be configured as a data file on the internet enabled device such that the file comprises application information, however, the application may not be configured to interface with the internet enabled device. At operation 404, the application file is saved onto the internet enabled device. In some embodiments, the application file may not be compatible with interfacing with the internet enabled device and may rather be configured to contain the application information without executing any programing. At operation 406, it is determined if the application file contains a hash signature, or similar encryption format. If the application does not include a hash signature or similar, at operation 410, the internet enabled device is connected to the multi-function device (MFD) via data communication. At operation 412, the application file is installed to the multi-function device.

If the application file comprises a hash signature or similar encryption, at operation 420, the hash signature is determined. In some embodiments, the hash signature may correspond to information pertaining to the transfer from the internet enabled device to the multi-function device. For example, the hash signature may comprise a predetermined number of licenses (e.g., a number of multi-function devices to be installed on), a compatibility hash (e.g., types of devices the application is compatible with), or similar. After the hash signature is determined, at operation 422, the internet enabled device is connected to the multi-function device via data communication. At operation 424, it is determined if the hash signature is compatible with or licensed for download to the multi-function device. If the hash signature is compatible with or licensed for download, at operation 412 the application is installed onto the multi-function device. If the hash signature is not compatible with or not licensed for download to the multi-function device, at operation 426, an error occurs, thereby preventing the transfer of the application file from the internet enabled device to the multi-function device. In some embodiments, at operation 428, an error message may be sent to the internet enabled device. The error message may include directions to remedy the installation.

FIGS. 8-9 illustrate flowcharts of a system, method, and computer program product according to example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 286, 296 and executed by, for example, the processor 270, 272. As will be appreciated, any such computer program product may be loaded onto a computer or other programmable apparatus (for example, a marine electronic device 260) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 260) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed:

1. A system for installing one or more applications, the system comprising:
    an internet enabled device comprising:
        a processor;
        a display; and
        a memory including computer program code, the computer program code configured to, when executed, cause the processor to:
            receive user input indicating the selection of an application for execution on a marine electronics device of a watercraft without use of the internet enabled device, wherein the application includes an underlying application function for utilizing one or more features of the application via the marine electronics device and without the internet enabled device once the application is loaded onto the marine electronics device;
            download a file comprising application data on the internet enabled device, wherein the file is not compatible for user interfacing with the underlying application function of the application on the internet enabled device; and
            determine if the file includes a hash signature, wherein if the file does not include the hash signature, the internet enabled device is enabled to connect to the marine electronics device via data communication and allow installation of the application onto the marine electronics device;
    the marine electronics device of the watercraft, wherein the marine electronics device is remotely located from the internet enabled device, the marine electronics device comprising:
        a processor;
        a display; and
        a memory including computer program code, the computer program code configured to, when executed, cause the processor to:
            engage in the data communication with the internet enabled device;
            receive the file comprising the application data;
            if the file does include the hash signature, determine if the hash signature is compatible with or licensed for download to the marine electronics device, wherein, if the file is not compatible with or licensed for download to the marine electronics device, the application is not enabled to be installed onto the marine electronics device;
            if the file does not include the hash signature or if the file does include the hash signature and the hash signature is compatible with or licensed for download to the marine electronics device, install the application within the memory; and
            cause, on the display of the marine electronics device, presentation of an interface that enables user interfacing with the underlying application function of the application and utilization of the one or more features without utilizing the internet enabled device,
    wherein the data communication between the internet enabled device and the marine electronics device is non-internet based.

2. The system of claim 1, wherein the application is selected from a parent application store within a parent application.

3. The system of claim 2, wherein the parent application is downloaded from an operating system application store.

4. The system of claim 2, wherein, after being downloaded onto the internet enabled device, the file comprising the application data is stored within the parent application.

5. The system of claim 2, wherein the parent application receives updates to the file and pushes the updates to the file to the marine electronics device.

6. The system of claim 1, wherein the file automatically deletes from the internet enabled device after the file is installed onto a set number of marine electronics devices.

7. The system of claim 1, wherein the data communication between the internet enabled device and the marine electronics device is proximity based.

8. The system of claim 1, wherein the data communication between the internet enabled device and the marine electronics device is Bluetooth based.

9. A method of installing an application on a multi-function device, the method comprising:
    connecting an internet enabled device to the internet;
    downloading a file to the internet enabled device, wherein the file is not compatible with the internet enabled device; wherein the file comprises application data corresponding to an application for execution on the multi-function device of a watercraft without use of the internet enabled device, wherein the application includes an underlying application function for utilizing one or more features of the application via the multi-function device and without the internet enabled device once the application is loaded onto the multi-function device, wherein the file is not compatible for user interfacing with the underlying application function of the application;
    determining if the file includes a hash signature, wherein if the file does not include the hash signature, the internet enabled device is enabled to connect to the multi-function device via data communication and allow installation of the application onto the multi-function device;
    engaging in the data communication between the internet enabled device and the multi-function device, wherein the internet enabled device is remote from the multi-function device, and wherein the data communication between the internet enabled device and the multi-function device is non-internet based;
    if the file does include the hash signature, determining if the hash signature is compatible with or licensed for download to the multi-function device, wherein, if the file is not compatible with or licensed for download to the multi-function device, the application is not enabled to be installed onto the multi-function device;

if the file does not include the hash signature or if the file does include the hash signature and the hash signature is compatible with or licensed for download to the multi-function device, causing installation of the file onto the multi-function device, wherein the application is compatible with the multi-function device when used with software of the multi-function device; and causing, on a display of the multi-function device, presentation of an interface that enables user interfacing with the underlying application function of the application and utilization of the one or more features without utilizing the internet enabled device.

10. The method of claim 9, wherein the file is downloaded from a parent application, wherein the parent application is compatible with the internet enabled device.

11. The method of claim 10, wherein the parent application is downloaded from an operating system application store.

12. The method of claim 10, wherein the file comprising the application data is stored within the parent application.

13. The method of claim 10, wherein the parent application receives updates to the file, and wherein the internet enabled device pushes the updates to the multi-function device.

14. The method of claim 9, wherein the file automatically deletes from the internet enabled device when a set number of multi-function devices is reached.

15. A marine electronics device for a watercraft, the marine electronics device comprising:

a display;

a processor; and a memory comprising a computer program code, the computer program code configured to, when executed, cause the processor to:

receive a notification of an application to be installed from an internet enabled device, wherein the application is for execution on the marine electronics device of the watercraft without use of the internet enabled device, wherein the application includes an underlying application function for utilizing one or more features of the application via the marine electronics device and without the internet enabled device once the application is loaded onto the marine electronics device;

engage in data communication with the internet enabled device, wherein the internet enabled device is remote from the marine electronics device, and wherein the data communication between the internet enabled device and the marine electronics device is non-internet based;

receive a file comprising application data from the internet enabled device, wherein the file is not compatible with the internet enabled device, wherein if the file does not include a hash signature, the internet enabled device is enabled to connect to the marine electronics device via the data communication and allow installation of the application onto the marine electronics device;

if the file does include the hash signature, determine if the hash signature is compatible with or licensed for download to the marine electronics device, wherein, if the file is not compatible with or licensed for download to the marine electronics device, the application is not enabled to be installed onto the marine electronics device;

if the file does not include the hash signature or if the file does include the hash signature and the hash signature is compatible with or licensed for download to the marine electronics device, install the file; and cause, on the display, presentation of an interface utilizing functionality from the application and enabling utilization of the one or more features without utilizing the internet enabled device.

16. The marine electronics device of claim 15, wherein the application is selected from a parent application store within a parent application.

* * * * *